Sept. 24, 1968          S. ELMER          3,402,779
HAND TOOL COMPRISING A COMPRESSED-AIR MOTOR
Filed June 8, 1966
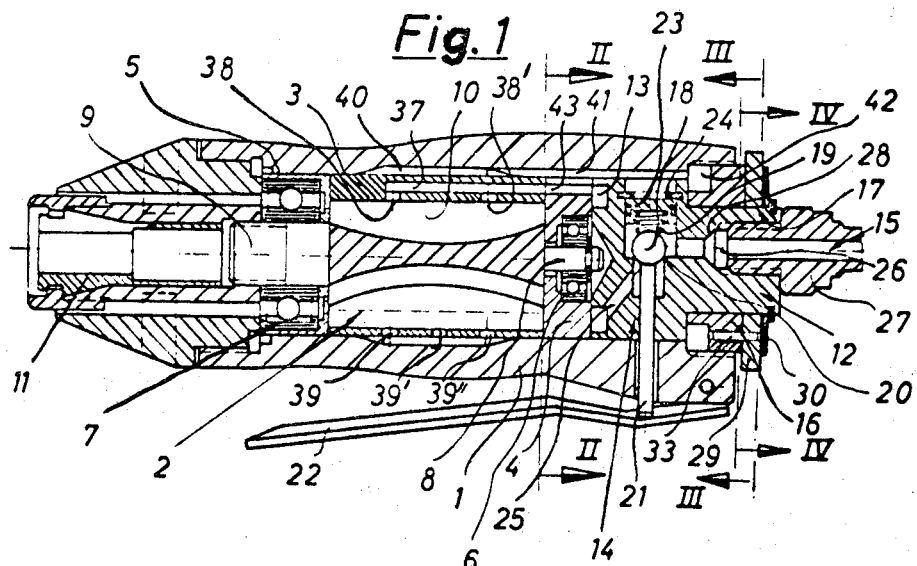
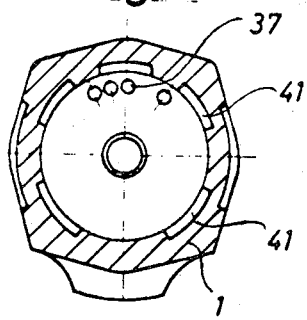
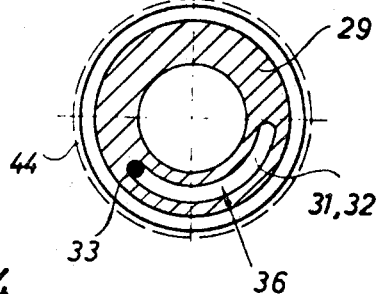
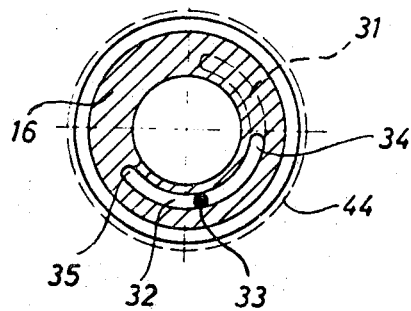
INVENTOR
Stefan Elmer
Polachek & Saulsbury
ATTORNEYS

United States Patent Office 3,402,779
Patented Sept. 24, 1968

3,402,779
**HAND TOOL COMPRISING A
COMPRESSED-AIR MOTOR**
Stefan Elmer, Maulbronn, Germany, assignor to Schmid
& Wezel, Maulbronn, Germany
Filed June 8, 1966, Ser. No. 556,060
Claims priority, application Germany, Aug. 26, 1965,
Sch 37,615
9 Claims. (Cl. 173—170)

ABSTRACT OF THE DISCLOSURE

A hand tool having a housing with a compressed-air motor therein. Means is provided for adjusting the cross-section of flow for the compressed air. At a given pressure gradient, the size of the cross-section of the flow for the air controls the air flow rate and with it the power and speed of the compressed-air motor. A quick closing valve is incorporated in the path of movement of the compressed air between the air inlet and the rotor of the motor. The motor comprises a stator and a rotor rotatably mounted in the stator. The flow path comprises longitudinal bores, and a flow passage in said rotor connected at one end by said additional bores to said longitudinal bores. Grooves formed in the housing extend parallel to the longitudinal bores. Transverse bores in the stator connect the other end of the flow passage to the grooves. The grooves open into a collecting chamber in the housing.

---

A hand tool comprising a housing, and a compressed-air motor in the housing. The path of air flow extends through the motor and an adjustable throttle valve is incorporated in the flow path. The motor includes a stator and a rotor rotatably mounted in the stator. The path of air flow extends through the motor and includes longitudinal bores formed in the stator. Additional bores extend at right angles to the longitudinal bores. There is a flow passage in the rotor connected at one end by the additional bores to said longitudinal bores. Grooves are formed in the housing and extend parallel to the longitudinal bores. The stator is formed with transverse bores which connect the other end of the flow passage to said grooves. A collecting chamber is formed in the housing into which said grooves open.

This invention relates to a hand tool comprising a compressed-air motor. Hand tools for certain purposes are provided with compressed-air motors rather than electric motors, particularly in locations where a compressed-air system is available. With known compressed-air motors difficulties were involved in the regulations and adjustment of speed.

To avoid these difficulties, it is a feature of the invention to provide means for adjusting the cross-section of flow for the compressed air. At a given pressure gradient, the size of the cross-section of flow for the air controls the air flow rate and with it the power and speed of the compressed-air motor.

For convenience of operation, a quick-closing valve may be incorporated in the path of the compressed air between the air inlet and the rotor of the motor and this valve may comprise a ball, a pin for lifting this ball from its seat, a hand lever for actuating said pin, a spring arranged to load said ball, and an axially immovable sealing sleeve forming an abutment for the spring. This quick-closing valve has no influence on speed and serves only for starting and stopping the motor.

According to the invention, the stator is provided with a longitudinal bore and with bores at right angles to this longitudinal bore. Compressed air flows through these bores to the rotor. The stator is formed with additional transverse bores, which feed compressed air into grooves, which are formed in a housing and extend parallel to the longitudinal bores and open into a collecting chamber, which is closed by an inner ring mounted in said housing. This inner ring is formed with a peripherally extending slot. A rotatably outer ring is mounted on the inner ring and formed with a generally identical slot. The degree of overlap of these slots controls the size of the cross-section of flow. A movement of the outer ring relative to the inner ring will vary the flow rate of air through the motor and with it the speed of the motor under a given load.

In a desirable development of the invention, the inner ring may have external screw threads, which engage screw threads of the housing, and the inner periphery of the inner ring may be guided on an insert, which incorporates the quick-closing valve and on which the outer ring is also rotatably mounted. A split spring ring is mounted in the insert and urges the outer ring against the inner ring and axially locates the outer ring. This arrangement ensures that the rings will be in snug contact with each other so that losses of compressed air are avoided, particularly with small cross-sections of flow. A pin is press-fitted in the outer ring and slidable in the slot of the inner ring to form a stop, which is effective in the end positions providing for the largest and smallest cross-sections of flow, respectively.

It has been found that it is desirable to form the insert with an eccentric air inlet, to provide the insert with a threaded nipple, which forces a conical mouthpiece on a conical seat, and to form the insert with an annular chamber and an inclined bore, which connects said annular chamber to the quick-closing valve, a bearing ring being provided and formed with bores, which connect the longitudinal bores in the stator to said annular chamber.

Further features of the invention will become apparent from the subclaims and the following description of an embodiment shown by way of example on the accompanying drawing.

FIG. 1 is a longitudinal sectional view showing a hand tool,

FIG. 2 a transverse sectional view taken on line II—II of FIG. 1,

FIG. 3 a transverse sectional view taken on line III—III in FIG. 1,

FIG. 4 a transverse sectional view taken on line IV—IV of FIG 1.

A housing 1 incorporates a compressed-air motor 2, which comprises a stator 3, which is axially located between bearing blocks 4, 5. These bearing blocks 4, 5 contain ball bearings 6, 7, which guide stub shafts 8, 9 of a rotor 10. The stub shaft 9 carries directly a chuck 11, which is capable of gripping any desired tool, which will then rotate at the same speed as the stub shaft 9.

In the housing 1, the bearing block 4 is adjoined by an insert 12, which is formed with an annular chamber 13 on the side facing the bearing block 4. The insert 12 accommodates a quick-closing valve 14 and is formed with an air inlet 15 and is axially located by an inner ring 16, which is screwed in the housing 1 and guided on an extension 17 of the insert 12.

The quick-closing valve 14 comprises a ball 18, a spring 19 urging said ball against a seat 20, and a pin 21 which is axially movable by a hand lever 22 to lift the ball 18 from its seat 20. The spring 19 bears on a sealing sleeve 23, which is held by a spring ring 24 on the insert 12. The valve chamber is connected at one end to the air inlet 15 and at the other end by an inclined bore 25 to the annular chamber 13. A conical mouthpiece 26 is disposed in the air inlet 15 and forced by a nipple 27 onto a conical seat 28.

An outer ring 29 is centrically mounted on the extension 17 of the insert 12 and is rotatable relative to the inner ring 16. This ring 29 is urged against the inner ring 16 by a spring ring 30, which is mounted on the insert 12. The outer ring 29 and the inner ring 16 have peripherally extending slots 31, 32, which extend around an arc of, e.g., less than 180° and are generally congruent, having the same radius. A pin 33 is press-fitted in the outer ring 29 and slidable in the slot 32 of the inner ring 16. This pin 33 is engageable with the ends 34, 35 of the slot 32. The degree of overlap of slots 31, 32 determines the area of the cross-section of flow 36. When the two rings 16, 29 are in the position shown in FIG. 3, this degree of overlap is 100%, and when the rings are in the position shown in FIG. 4, the degree of overlap is about 50%. The stator 3 is formed with longitudinal bores 37, which are connected to the chambers of the rotor 10 by bores 38, 38' extending at right angles to the bores 37. Transverse bores 39, 39', 39" are provided, which open into an annular chamber, which is connected by grooves 41, formed in the housing 1, to a collecting chamber 42 defined by a recess in the inner ring 16, the housing 1 and the insert 12.

When the hand lever 22 is moved toward the housing 1, the pin 21 lifts the ball 18 from its seat 20. Compressed air can now flow from the air inlet 15 through the inclined bore 25 into the annular chamber 13 and further through bores 43 in the bearing block 4 to the longitudinal bores 37 in the stator 3. The bore entering the chambers of the rotor 10 through the bores 38, 38' drives the rotor 10 and its stub shaft 9 as well as the tool mounted in the chuck 11. The air which has delivered its energy is discharged through the transverse bores 39, 39', 39" into the annular chamber 40 and further through the grooves 41 to the collecting chamber 42, whence the air is exhausted through the slots 31, 32. Depending on the position of the rings 16, 29, there is a more or less pronounced throttling at the outlet and the degree of this throttling controls the speed of the rotor 10. The outer ring is adjusted in accordance with the desired speed, which is thus continuously adjustable. The outer ring 29 is suitably provided with a knurled or milled rim 44.

I claim:

1. A hand tool which comprises a compressed-air motor, means providing an air flow path extending through said motor, and an adjustable throttle valve incorporated in said flow path, said motor comprising a stator rotatably mounted in said stator, said stator being mounted in a housing, said flow path comprising a longitudinal bore formed in said stator, additional bores extending at right angles to said longitudinal bores, a flow passage in said rotor connected at one end by said additional bores to said longitudinal bores, grooves formed in said housing and extending parallel to said longitudinal bores, transverse bores formed in said stator and connecting the other end of said flow passage to said grooves, said tool further comprising an inner ring mounted in said housing and defining a collecting chamber therein, said grooves opening into said chamber.

2. A hand tool as set forth in claim 1, in which said inner ring is formed with a peripherally extending slot and constitutes a part of said throttle valve, and said throttle valve comprises an outer ring, which adjoins said inner ring and is rotatable relative thereto and formed with a peripherally extending slot, which is adapted to register with said slot in said inner ring.

3. A hand tool as set forth in claim 2, in which said housing has internal screw threads and said inner ring has external screw threads engaging said internal screw threads, and which comprises an insert mounted in said housing, said inner ring having an inside peripheral surface in guided engagement with said insert, said outer ring being rotatably mounted on said insert.

4. A hand tool as set forth in claim 3, which comprises a split spring ring mounted in said insert and arranged to urge said outer ring against said inner ring and to axially locate said outer ring.

5. A hand tool as set forth in claim 4, in which said flow path comprises an air inlet formed in said insert, said insert is formed with a conical seat and comprises a conical mouthpiece and a screw-threaded nipple holding said mouthpiece against said seat, said insert is further formed with an annular chamber and an inclined bore connecting said annular chamber to said quick-closing valve, said hand tool further comprising a bearing block rotatably mounting said rotor and formed with bores which connect said annular chamber to said longitudinal bores in said stator.

6. A hand tool as set forth in claim 3, in which said insert comprises a quick-closing valve incorporated in said flow path.

7. A hand tool as set forth in claim 2, which comprises a pin, which is mounted in one of said rings and slidable in said slot in the other of said rings and engageable with each of the ends of said last-mentioned slot.

8. A hand tool which comprises a compressed air motor, means providing an air flow path extending through said motor, and an adjustable throttle valve incorporated in said flow path, said throttle valve comprising an inner ring and an outer ring, which adjoins said inner ring and is rotatable relative thereto, and each of said rings being formed with a peripherally extending slot, said slots being adapted to register in varying degrees to provide throttling, said outer ring being adjustable.

9. A hand tool as set forth in claim 8, which comprises a pin, which is mounted in one of said rings and slidable in said slot in the other of said rings and engageable with each of the ends of said last-mentioned slot.

References Cited

UNITED STATES PATENTS

| | | | |
|---|---|---|---|
| 2,581,033 | 1/1952 | Larson | 173—169 X |
| 2,763,060 | 9/1956 | Swanson | 173—169 X |
| 2,898,791 | 8/1959 | Maurer | 173—169 X |
| 3,097,571 | 7/1963 | Kaman | 173—169 X |
| 3,129,796 | 4/1964 | Karden | 173—169 X |

NILE C. BYERS, JR., *Primary Examiner.*